Dec. 17, 1957 R. D. CLARK ET AL 2,816,803
CONVEYANCE OF GRANULAR SOLIDS
Filed Nov. 15, 1954
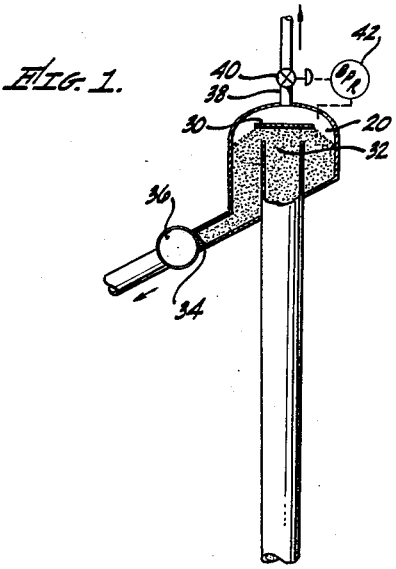
FIG. 1.
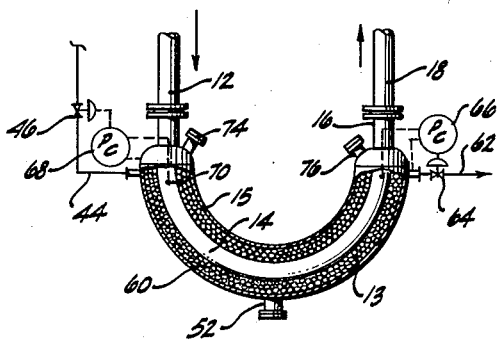
FIG. 2.
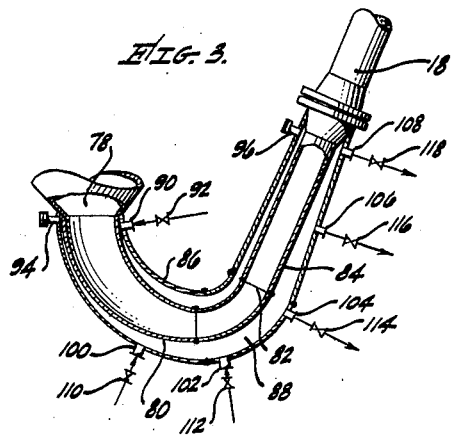
FIG. 3.
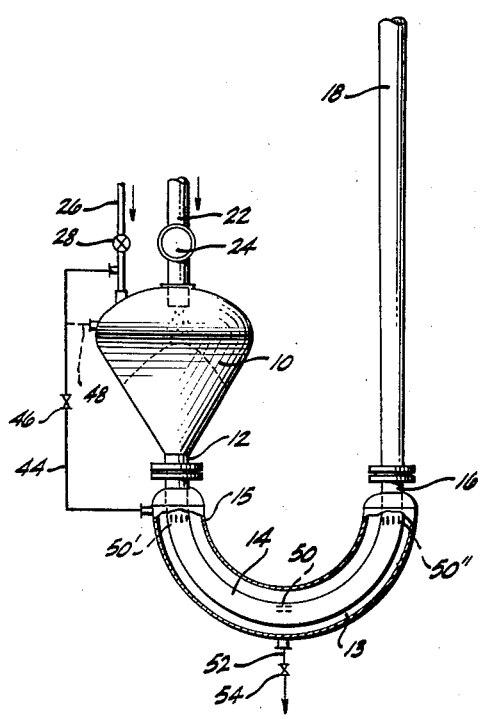
INVENTORS.
ROBERT D. CLARK,
JOHN E. HINES, JR.
AGENT.

United States Patent Office 2,816,803
Patented Dec. 17, 1957

2,816,803

CONVEYANCE OF GRANULAR SOLIDS

Robert Duff Clark and John E. Hines, Jr., Long Beach, Calif., assignors to Union Oil Company of California, Los Angeles, Calif., a corporation of California Application November 15, 1954, Serial No. 468,628

10 Claims. (Cl. 302—53)

This invention relates to the conveyance of granular solids and in particular relates to the conveyance of such solids through conduits under the influence of a concurrently depressuring conveyance fluid while maintaining the granular solids in substantially compact form. Specifically the present invention relates to an improved method and apparatus for introducing compact granular solids into such a conveyance conduit wherein an arcuate conduit internally hardened and polished is protected from the elevated conveyance fluid pressure by a specially designed pressure zone.

The movement of granular solids in appreciably large quantities presents a technical problem in many industrial operations such as the movement of cracking catalysts in the well-known T. C. C. and fluid cracking processes, the conveyance of sand from tar sand retorting processes, the movement of ores and coal in metallurgical operations, and in many other industrial processes in which large quantities of granular solids are employed. Problems are encountered particularly when granular solids must be transported continuously at high volumetric flow rates, or under pressure, or under conditions where losses of the solids due to attrition or abrasion must be minimized. Such conditions are pronounced in the transportation of expensive granular catalysts which are required to be circulated at rates of as high as 800 to 1000 tons per hour as, for example, in catalytic cracking processes employing high catalyst-to-oil ratios.

Conventionally granular solids are conveyed by moving mechanical equipment such as bucket elevators, the various forms of belt conveyors and other apparatus such as open or enclosed drag lines. For atmospheric pressure operations or where solids attrition is immaterial, such mechanical equipment adequately serves to transport the granular solids at moderate rates. However, when the solids are desirably transported at high flow rates, or in connection with processes in which fluids under pressure contact the granular solids, or in processes where the attrition loss of granular solids must be kept at a minimum, numerous disadvantages of such mechanical conveyances present themselves. Among these problems is the size of the equipment necessary to transport large quantities of granular solids. For example, the bucket elevators necessary to transport cracking catalyst at a rate of about 150 tons per hour are approximately 4 feet in length, 1 foot in width, and 1½ feet deep. Furthermore, the maintenance of the necessary driving mechanism at temperatures of the order of those in the cracking processes is difficult and expensive. Furthermore, the quantity of granular solids lost by attrition in loading and unloading the buckets is frequently excessive.

It is therefore an object of the present invention to provide an improved method for the conveyance of granular solids through relatively small sized equipment at relatively high volumetric flow rates without the disadvantages inherent in conveyors having moving mechnical parts.

It is an additional object of this invention to provide a method for the conveyance of granular solids in which no moving mechanical equipment is employed and the conveyance is effected by a depressuring concurrent flow of a conveyance fluid through a conduit carrying the granular solids in substantially compact form.

It is a more particular object of the present invention to provide an improved method for the injection of granular solids into a conveyance zone in which compact granular solids are conveyed.

It is a particular object of the present invention to provide a special inlet section to such a conveyance conduit whereby increased flow rates over those heretofore obtained are now possible and in which the granular solids flow by gravity into the inlet section and are redirected therein from the direction of gravity flow into the direction of flow in the conveyance conduit.

It is a more specific object of this invention to provide an improved conveyance process for compact granular solids in which such solids are passed by gravity from an accumulation thereof downwardly by gravity through an internally surface hardened arcuate inlet or redirection zone concurrently with a conveyance fluid into an elongated conveyance zone to a delivery point and wherein said arcuate inlet zone is surrounded by an arcuate pressure zone which is maintained at a pressure sufficient to relieve the wall of said inlet zone of at least a substantial portion of the pressure of said conveyance fluid therein.

It is also an object of this invention to provide an apparatus adapted to effect the aforementioned objects.

Other objects and advantages of this invention will become apparent to those skilled in the art as the description thereof proceeds.

Briefly the present invention comprises the conveyance of substantially compact granular solids by means of a concurrently depressuring conveyance fluid which may be liquid or gaseous. A consideration of the coefficient of expansion of the particular fluid employed is necessary in order that a constant conveyance force ratio, defined in Equation 3 below, be maintained throughout the conveyance zone for maximum efficiency. When liquid fluids are used or gaseous fluids are employed under conditions wherein the total pressure drop through the conveyance zone is less than about 5 percent of the absolute inlet pressure, the expansion of the conveyance fluid is generally negligible and no special means need be provided for maintaining a constant conveyance force ratio. In the other cases when gaseous fluids are used with a pressure drop exceeding about 5 percent of the absolute inlet pressure, the expansion of the fluid causes substantial fluid velocity changes which result in the undesirable variation of the conveyance force ratio within the conveyance zone.

An additional factor must be considered in the maintenance of constant force ratios which is dependent upon the contribution (upon pressure decrease) of part of the conveyance fluid present in the void spaces of the solids to that part of the conveyance fluid which is considered to be flowing through the interstices of the granular solids. Thus, not only does expansion of the flowing conveyance fluid cause changes in the conveyance fluid velocity and the force ratio but also the expansion of conveyance fluid carried in the void spaces between individual particles has the same effect.

In order to compensate for these and other factors it has been found that by increasing the cross-sectional area of the conveyance zone in the direction of solids flow, a constant conveyance fluid velocity and force ratio may be maintained. For flows of gaseous fluids it has been found that the taper of the conveyance zone, or the change in cross-sectional area with distance from its solids inlet, required to maintain a constant force ratio is correlated by the following equation:

$$\frac{A_2}{A_1} = \frac{1}{A_1}\left(\frac{aQ}{\rho_s}\right)\left(\frac{m.w.}{RT}\right)^{1-\frac{1}{n}}(P_1-P_2)\left(\frac{C}{P_2\frac{dp}{dl}}\right)^{\frac{1}{n}} + \left(\frac{P_1}{P_2}\right)^{\frac{1}{n}} \quad (1)$$

wherein $a$ is the void fraction of the bulk of the solids, no units
A cross-sectional area of conduit, square feet
C permeability constant as determined from:

$$\frac{dp}{dl} = C\rho^{n-1}V^n \quad (2)$$

wherein $dp/dl$ is the pressure gradient, pounds per square foot per foot
$\rho$ is the fluid density, pounds per cubic foot
V superficial gas velocity, feet per second
$n$ exponent; 1.0 for viscous flow and 1.85 for turbulent flow
$P$ = pressure in conduit; pounds per square foot
$Q$ = solids flow rate; pounds per second
$R$ = gas constant; 1543 foot pounds per ° R. per pound mol
$T$ = temperature; ° R.—460= ° F.
$\rho_s$ = bulk density of solids; pounds per cubic foot
1 = subscript, reference to inlet of conduit section considered
2 = subscript, reference to outlet of conduit section considered
(Other consistent units may be substituted)

Therefore, by employing the above correlation a line for solids conveyance may be designed with a constant conveyance force ratio throughout. Where the distance of conveyance and the characteristics of the solids are known, the change in pressure (which is linear) can be calculated knowing that $$\frac{\frac{dp}{dl}}{\rho_s \cos \theta} \geq 1.0 = 1.1 \quad (3)$$

wherein $\theta$ is the angular deviation of the conduit from a vertical upward reference axis and other terms are given above. The value of $A_1$ is determinable from well known correlations of the rates of gravity flow of granular solids from orifices of various cross-sectional areas.[1] From the required solids delivery rate the cross-sectional area $A_1$ is selected, the solids delivery rate Q is know, the void fraction $a$, the bulk density of the solids $\rho_s$, and the solids permeability factor C are determined from the granular solids physical characteristics. $P_2$ is the desired line outlet pressure and $P_1$ is estimated from the length of the line and from a known value of the conveyance force ratio, for example a value of 1.1. The reverse procedure is permissible, i. e. the estimation of $P_2$ from a known $P_1$. Using Equation 1 and the foregoing data, values of $A_2$ are determined for various lengths from the solids inlet by considering successive lengths of the conveyance zone or an estimation of the over-all area change may be made by a similar calculation over the entire length of the conveyance zone.

The conveyance of compact or dense solids masses as briefly described above is very substantially improved by the provision of an arcuate inlet zone, which is connected at its inlet opening so as to receive a downward gravity flow of solids to be conveyed and a concurrent conveyance fluid flow, and which inlet zone is connected at its outlet

[1] A. I. Ch. E., vol. 41 (1945), p. 220.

opening with the entrance to an elongated conveyance zone whose attitude is such that the solids will not flow therethrough in the desired direction and at the required flow rate by gravity alone. Solids conveyance rate increases of the order of 1400% have been obtained with such an arcuate inlet conduit.

Further increases in rate and operational stability have been obtained by operating this arcuate inlet zone with a progressively increasing conveyance fluid pressure gradient. This is accomplished by injecting additional fluid, or by providing an inlet zone having a cross-sectional area which decreases with distance from its inlet opening.

The present invention includes a further improvement in the arcuate inlet zone employed in the dense solids mass conveyance process described briefly above. It has been found highly desirable to provide the inner surface of the arcuate inlet zone during construction so that it already has a hard and highly polished surface when operation begins. The initial coefficient of friction is reduced to very small values thus reducing the required pressure differential and still further reducing attrition of the solids and the initial erosion of the conveyance zone's inner surfaces. Ultimately the internal surface becomes polished during the initial operations, but this polishing causes some attrition loss which is avoidable.

Such hardened and highly polished surfaces are desirable for use in the conveyance zone itself for the same reasons, and may be applied therein by using a centrifugally cast 1020 carbon steel to which is centrifugally added an inner liner of 440C Stainless Steel and hardened. Other surface hardening techniques such as nitriding, carburizing, hard facing, etc. may also be employed. The surface thus obtained may thereafter be polished and even plated if desired before being placed in use.

However, these hardening and polishing techniques which are readily applied to the inner surfaces of straight pipe or tube, are not applicable directly to the tapered conduit or to the arcuate conduit section forming the arcuate inlet zone leading into the conveyance zone. Because of the curvature, centrifugal casting is inapplicable and the usual surface hardening processes are difficult to employ successfully. Often the hardening treatment penetrates quite deeply through the conduit wall having a detrimental effect upon the strength of the arcuate section and it is unable to withstand superatmospheric operating pressures and temperatures even though the other desired advantages of hardening and polishing are realized.

In the present invention, a pressure zone is provided surrounding the arcuate inlet zone and within a larger diameter arcuate conduit which is substantially coaxial with the inlet conduit and which is integrally attached thereto at its ends. The closed space between these conduits comprises the pressure zone and it is maintained at a pressure substantially equal to that at which the conveyance fluid exists in the arcuate inlet zone. This results in the maintenance of a pressure differential between the arcuate inlet zone and the pressure zone which is substantially zero, and the larger diameter arcuate conduit enclosing the pressure zone withstands the whole superatmospheric operating pressure. In this manner the inner surface of the inlet zone conduit can be hardened and polished without regard to an accompanying loss in physical strength.

In one modification of this invention, the pressure zone is connected so as to communicate directly with the conveyance fluid phase in the upper part of the induction zone, or with the conveyance fluid inlet conduit opening thereinto. In either case, the pressure zone will operate slightly above the fluid pressures existing throughout the arcuate inlet conduit.

In another modification, at least one lateral aperture is provided through the wall of the arcuate inlet conduit into the pressure zone which automatically keeps the pressure zone at a pressure substantially equal to that existing within the inlet zone at the point adjacent the apertures. When the lateral aperture is near the inlet opening of the arcuate conduit, the pressure zone operates again at a pressure slightly above the average inlet zone pressure. When the lateral aperture is near the outlet of the arcuate conduit, the pressure zone operates slightly below the average pressure in the arcuate conduit. A pressure zone pressure substantially equal to the average value in the arcuate inlet zone is obtained by placing the communicating aperture on the upper surface of the arcuate conduit at a point equidistant from its ends. In this modification the pressure zone operates at a pressure slightly below that at the arcuate zone inlet and slightly above that at the arcuate zone outlet.

In a further modification, the pressure differential through the arcuate inlet zone wall may be maintained precisely at zero at all points along the arcuate inlet zone by filling the pressure zone with a dense stationary mass of compact granular solids and bleeding a small flow of fluid, such as the conveyance fluid from the conveyance fluid source or from the upper part of the induction chamber, through this mass in a direction concurrent with the flow in the arcuate inlet zone. The serially connected interstices of the stationary dense solids in the pressure zone present a high resistance flow path which permits the bleed fluid to generate a pressure and a pressure gradient which equals those in the arcuate inlet zone. The static solids are preferably considerably smaller in average diameter than the solids being conveyed so as to decrease permeability thereof and thus minimize the rate of bleed fluid flow required to generate in the pressure zone these pressures and pressure gradients. In addition, the cross-sectional area of the pressure zone is also preferably made as small as possible so as to aid in reducing the bleed gas requirement still further. The static solids are prevented from motion by restricting the bleed fluid outlet so as to permit discharge of fluid yet prevent solids flow therefrom. A screen, or grid, or porous metal or ceramic plate, or the like, placed over the bleed fluid outlet is adequate. A back pressure regulator or a zero governor placed at the bleed fluid outlet controls the bleed fluid pressure at a value equalling the conveyance fluid pressure at the corresponding point in the arcuate inlet zone. A similar instrument at the bleed fluid inlet serves to maintain the bleed fluid pressure at all points throughout the pressure zone equal to the conveyance fluid pressure existing in the arcuate inlet zone at a point on the opposite side of the arcuate inlet zone wall.

The principles of this invention are applicable to arcuate inlet zones of constant cross section throughout their lengths as well as to those in which the cross sections are decreased in the flow direction to provide an increasing pressure gradient. In the latter case, the identical pressures and pressure gradient can be provided by constructing the pressure zone with a decreasing cross section and filling it with a static bed of dense solids. However, it is easier to approximate only the required decreasing area in the pressure zone and provide one or more additional bleed fluid drawoffs along the length thereof which are controlled by back pressure regulators or zero governors to maintain a given bleed fluid pressure equal to the conveyance fluid pressure at the opposite point through the arcuate conduit wall.

The process and apparatus of the present invention will be more clearly understood by reference to the accompanying drawings in which:

Figure 1 illustrates an elevation view in partial cross section of the conveyance system showing the pressure jacketed arcuate inlet conduit, and Figures 2 and 3 are detailed elevation views of other modifications of the pressure jacketed inlet conduit.

Referring now more particularly to Figure 1, the essential elements of the improved apparatus according to this invention include solids induction chamber 10, redirection or inlet zone 14, conveyance zone 18, and fluid-solids separator chamber 20. Induction chamber 10 communicates directly with redirection zone 14 through connecting zone 12 and redirection zone 14 communicates through transition zone 16 with conveyance zone 18. Granular solids are introduced into induction zone 10 through line 22 controlled by solids flow control means 24. The latter element 24 may be either a shut-off valve when intermittent or batch-wise conveyance of granular solids is desired, or may be one of the well known improved types of pressure-tight star feeders presently available. The star feeder permits the continuous introduction of granular solids into chamber 10 against a higher pressure existing therein. The conveyance fluid is introduced via line 26 at a rate controlled by valve 28. Preferably valve 28 is automatically actuated to maintain a predetermined conveyance fluid pressure ($P_1$) therein, or may be regulated to provide a constant fluid input to chamber 10.

The granular solids discharge successively through zones 12, 14, 16 and through conveyance zone 18 into separator 20. Thrust plate 30 is disposed transverse to and adjacent outlet opening 32 of conveyance zone 18. This plate establishes a thrust force against the discharging solids which maintains the granular solids as a dense phase in substantially compact form while in motion in the conduit. Granular solids discharge from separator chamber 20 via line 34 at a rate controlled by element 36 which also controls the solids conveyance rate and which may, like element 24, comprise a control valve or an improved star feeder. Depressured conveyance fluid, at a low pressure ($P_2$) relative to the inlet of the conveyor, is discharged from chamber 20 via line 38 at a rate controlled by valve 40 in accordance with back pressure regulator 42. The depressured fluid may be recompressed and injected into induction chamber 10 if desired.

The granular solids flow through connecting zone 12 is downward and the diameter of this zone is preferably such that the gravity flow rate through such an area is at least equal to the required maximum solids flow rate in the conveyance zone. The gravity flow discharge of granular solids through an opening of given cross-secitonal area may be determined from any one of the many well known correlations of such data previously indicated. The length of connecting zone 12 is preferably at least equal to its own diameter and preferably between 1 and 5 diameters. The function of connecting zone 12 is not too well understood; however, it has been found very effective in improving the performance of the conveyance conduit under high rates of flow of solids so as to overcome a tendency to form voids. It is believed that zone 12 acts in some measure as a redirection zone, particularly for those granular solids flowing down the side of the conical bottom of chamber 10 nearest to the redirection and conveyance conduits. From a non-vertical path these solids attain in zone 12 a vertical downward path and are smoothly delivered into the arcuate redirection zone 14. In the absence of connecting zone 12 the particular granular solids referred to flow first in one non-vertical direction and then sharply change to a curving path in the opposite direction.

The granular solids flow concurrently with the conveyance fluid through arcuate inlet zone 14 which is surrounded by pressure shell or jacket 15 forming an annular pressure zone 13. The solids and fluid are delivered tangentially into the desired conveyance direction at the entrance to conveyance zone 18 and are conveyed therethrough as a continuous, dense, moving mass.

The cross-sectional area of conveyance zone 18 varies in accordance with the correlation given above to maintain a constant conveyance force ratio throughout its length, that is at a value between about 1.1 and 1.5, preferably. The pressure gradient $dp/dl$ also remains constant. The granular solids and the depressured conveyance fluid discharge as described above into separator chamber 20 from which each stream is separately removed.

In a first modification, the pressure within pressure zone 13 is maintained by connecting it through line 44 controlled by valve 46 with conveyance fluid inlet line 26. In this way whenever the system is started up for conveyance, the pressure zone is automatically brought to and maintained at a pressure equal to that of the entering conveyance fluid. The pressure differential between the top of induction chamber 10 and the lowest part of arcuate inlet zone 14 is usually less than about 1 p. s. i. and accordingly the pressure of zone 13 is only slightly higher than that of the conveyance fluid in inlet zone 14.

In a second modification, the pressure zone may be connected directly with the fluid space in the upper portion of induction zone 10 as by means of lines 44 and 48.

In a third modification, lines 44 or 48 may be substituted with at least one aperture 50 provided in the wall of arcuate inlet zone 14 whereby sufficient conveyance fluid flows therethrough into pressure zone 13 during start-up to bring it to the same pressure as that existing on the other side of the aperture 50 in the inlet zone 14. The pressure zone 13 pressure is slightly higher with apertures 50', slightly lower with apertures 50'', and substantially equal with apertures 50 to the average conveyance fluid pressure in inlet zone 14 respectively. An outlet or drain line 52 and valve 54 are provided opening from the bottom of shell 50.

In all of these various specific structures, the same effect is obtained, namely the substantial elimination of any outwardly acting pressure differentials in the hardened and internally polished arcuate inlet zone 14. Any superatmospheric operating pressure existing at or near the entrance to this conveyance system is sustained by pressure shell 15 which need not be hardened or polished and which is readily fabricated of high strength steels.

Referring now more particularly to Figure 2, a detail view in partial cross section of a fourth modification of the arcuate inlet zone of this invention is shown. Herein elements which are also shown in and described with Figure 1 are indicated by the same numbers but will not be described again. In this modification pressure zone 13 is substantially filled with a mass of compact granular solids 60 and bleed gas outlet line 62 and valve 64 operated by back pressure regulator 66 are provided adjacent the outlet end of arcuate inlet conduit 14. Line 44 is again connected to a source of fluid having a pressure substantially equal to or higher than that of the conveyance fluid introduced into the induction zone, not shown, but connected at line 12. As indicated in Figure 1, a small part of the conveyance fluid may be used in this service.

The serially connected interstices of the dense solids mass 60 within pressure zone 13 present a fluid permeable high resistance flow path for the bleed fluid flowing therethrough from bleed fluid inlet 44 to outlet 62. By regulation of valve 46, as by means of pressure controller 68, to maintain a bleed fluid pressure at inlet 44 which is equal to the conveyance fluid pressure inside arcuate inlet zone 14 at a point indicated at 70, a zero pressure differential is maintained at this end of the arcuate inlet zone 14. By regulating valve 64 in outlet line 62, such as by pressure controller 66, a zero pressure differential is maintained at the outlet end of the arcuate conduit 14. By so fixing the bleed fluid inlet and outlet pressures, a bleed fluid flow rate through solids mass 60 in pressure zone 13 is determined which maintains a zero pressure differential between the arcuate inlet zone and the pressure zone 13 throughout their entire concurrent length. The pressure controllers act as zero governors in maintaining these terminal zero pressure differentials and the equality of pressure is maintained even though the conveyance fluid pressure changes during operation.

The solids employed in static solids mass 60 in the pressure zone may be the same as the solids conveyed if desired, or they may be a size fraction thereof, or different solids from those conveyed. Preferably however, in order to minimize the flow of bleed gas required to maintain the equality of pressure, the cross-sectional area open to bleed gas flow in the pressure zone is made as small as is structurally practicable, and the solids employed are relatively small sized compared to the size of those conveyed so as to present the greatest resistance to bleed gas flow. By observing these two fundamentals, the bleed gas flow can readily be reduced to less than about 1% of the total conveyance fluid flow. Solids graded to have a relatively uniform size range are also preferable, and solids such as dry graded sand of about $-28+30$ mesh size are satisfactory in most conveying installations. However, smaller particles may be used when finer solids are being conveyed.

To fill pressure zone 13 with the static solids bed, inlets 74 and 76 are provided at the upper ends of pressure zone 13, and outlet 52 serves to drain solids therefrom when necessary.

Referring now to Figure 3, a fifth modification of the arcuate inlet zone of this invention is shown in which the arcuate inlet zone 80 is provided with a cross-sectional area which decreases with distance from the gravity flow entrance 78 to a point 82 tangent to the conveyance direction, and with a transition zone 84 whose cross-sectional area increases with distance therethrough and opens into conveyance zone 18 as before. A pressure shell or jacket 86 surrounds the arcuate inlet zone 80 and transition zone 84 forming therebetween a pressure zone 88. The conduits forming zones 80 and 84 are hardened and polished on their inner surfaces, and only pressure shell 86 sustains the operating pressure. Bleed or pressure fluid inlet 90 and valve 92 are provided opening into the inlet end of pressure zone 88.

If desired, pressure zone 88 may be left empty and operated in any of the manners described in connection with Figure 1, or a static bed of solids, not shown but entirely analogous to that shown in Figure 2, may be provided therein by means of solids inlets 94 and 96 and operated in the manner described in connection with Figure 2 with a zero pressure differential through the walls of arcuate inlet zone 80 and transition zone 84. Because of the non-uniform cross-sectional area of pressure zone 88 which results from the taper provided in conduits 80 and 84, a plurality of bleed gas connections 100, 102, 104, 106, and 108 are provided along the length of pressure zone and having valves 110, 112, 114, 116, and 118 respectively to regulate the portion of bleed fluid removed from or injected into each. These valves are preferably operated by a pressure controller to maintain the zero pressure differentials as described above. In the structure shown in Figure 3, additional bleed fluid is injected at inlets 100 and 102 because the pressure zone annular open area is increasing and greater quantities of fluid are required to maintain therein the same increasing pressure gradient as that existing in arcuate inlet zone 80. Bleed fluid is removed from outlets 104 and 106 as well as from principal outlet 108 because the pressure zone annular open area is here decreasing and successively smaller flows are required therein to maintain a decreasing pressure gradient and pressure corresponding to those in transition zone 84.

There are obviously modifications of this invention other than those specifically illustrated and described herein but which employ the fundamentals herein disclosed and will be apparent to those skilled in the art from this description.

As an example of one modification of the present invention, a dense solids conveyance apparatus designed to circulate 600 tons per hour of synthetic bead hydrocarbon cracking catalyst at 950° F. had an arcuate inlet and transition conduit very similar to conduits 80 and 84 shown in Figure 3. The arcuate inlet conduit was 18 inches O. D. at its inlet opening, 14 inches O. D. at the 90° point, and 12 inches O. D. at the junction with the transition conduit 84 at point 82 in Figure 3, the 160° point. Conduit 84 increased in outside diameter from 12 inches at its inlet to 14 inches at its outlet. Both elements had been hardened and internally polished by manual application of hard-facing prior to assembly.

The pressure shell consisted of a 20 inch O. D. 90° long radius weld L joined to a 20 inch O. D. 70° short radius weld L surrounding the arcuate inlet conduit, and the short radius L was joined to a tapered pipe surrounding the transition conduit and having a 20 inch O. D. at the L end and 16 inch O. D. near the end of the transition conduit. The ends of the pressure shell were welded to the induction chamber bottom and the conveyance conduit respectively and pressured to 120 p. s. i. g. with flue gas which was the conveyance fluid employed to circulate the catalyst. The arcuate inlet and transition conduits had wall thicknesses sufficient to operate at 120 p. s. i. g. at 950° F., but following the surface hardening and polishing the maximum operating pressure at 950° F. was only 15 p. s. i. g. This equipment was successfully operated at 100 p. s. i. g. for extended periods without trouble by provision of the pressure shell and operation of the pressure zone at 100 p. s. i. g.

In the present specification the term "substantially compact form" is intended to indicate a mass of solids having an operating bulk density which is substantially the same as the vibrational static bulk density of the solids determined when at rest and in the absence of moving fluids. To determine whether or not the solids in a conveyance line or any portion thereof are moving in substantially compact form, resort may be had to any one of the following methods, which involve determination of bulk densities directly, or differential pressures, or changes in differential pressures with changes in flow rate of the conveying fluid. The first method to be discussed involves direct measurement of bulk densities.

The usual determination of the bulk density of granular solid is made in a vessel of known volume by applying vibrational forces to a known mass of solid granules. It is indicated that the moving solids in the apparatus of this invention are in the form of a continuous porous mass having an operating bulk density which is substantially the same as this vibration bulk density.

The granular solids are conveyed in this state by means of a conveyance fluid depressuring through the substantially compact moving mass of granular solids so that substantially no fluidization or aeration or expansion of the porous mass of solids occurs to change the bulk density of the moving mass from this value.

It is recognized that the bulk density of a mass of granular solids is not always constant, but varies with the geometry of the particle arrangement. For example, a given mass of uniform spherical granules will have the least bulk density when systematically packed with particle centers coinciding with the corners of a cube (cubic packing—pore volume 47.64%)[2] and the greatest bulk density (about 41.5% greater) when uniformly packed with particle centers coinciding with the apexes of a tetrahedron (rhombohedral packing—pore volume 25.95%).[2] The bulk density of solids during conveyance according to this invention is intermediate between the bulk densities of solids uniformly packed according to the foregoing systems and is apparently a random mixture of several packing geometries. Similar density variations occur in packings of non-uniform and irregular particles.

In the conveyance system of the present invention such differences in packing arrangement apparently exist but they rarely if ever cause the bulk density of the moving solids to decrease more than 20% of the at-rest vibrational packed value and usually the decrease does not exceed about 5% of this value.

To illustrate the magnitude of the solids bulk density variation the following data are given typical of an operation for conveying compact solids:

| | |
|---|---|
| Conduit height, feet | 27.25 |
| Conduit attitude | Vertical |
| Conduit diameter, inches: | |
|   Inlet | 3.068 |
|   Outlet | 4.000 |
| Conveyance fluid | Air |
| Solids mesh size | 4–10 |
| Solids flow rate, lb./hr | 4,500 |
| Solids vibrational bulk density lb./cu. ft | 46.7 |

Upon depressuring the conveyance fluid from the bottom of the conduit while preventing further introduction of solids thereinto, it was noted that the solids level dropped only 0.25 foot from the solids outlet at the top of the 27.25 foot line indicating an operating solids bulk density of 46.3 pounds per cubic foot during conveyance. This is approximately an 0.85% decrease from the static value and in most cases the decrease is less than 2%.

Thus the operational density of the flowing solids may be determined simply by depressuring the conveyance conduit from the inlet end so as to prevent continued introduction of solids from the induction chamber into the conduit proper and observing the change in position of the solids level at the conduit outlet as was done in obtaining the data above. The operating bulk density of the solids then may be calculated by multiplying the static vibrational bulk density determined as previously described, by the ratio of the volume of that portion of the conduit remaining full of solids to the total volume of the conduit.

If more convenient, or as a check determination, the operating bulk density may also be determined by depressuring the conduit as above, removing the granular solids from the entire conduit, weighing this material and dividing the weight by the volume of the conduit in question.

Another test for determining whether or not the flowing solids are in substantially compact form consists in observing the change in differential pressure over a selected length of the conveyance conduit effected by changing the rate of flow of the conveyance fluid. In fluidized or aerated solids suspensions and the conventional gas lift processes, increases in aeration or conveyance fluid flow decrease the denisty of the suspensions being conveyed and correspondingly decreases this differential pressure while in the method of this invention increases in conveyance fluid flow rate through the compact solids increase the differential pressure markedly. This characteristic distinguishes the compact state of the granular solids flowing according to this invention from dense phase aerated suspensions of solids. For example, in a 140 foot long conduit carrying 500 tons per hour of compact granular cracking catalyst by means of compressed air, the pressure differential is 49.6 pounds per square inch. A 10% increase in the volume of air injected into the inlet of the conduit raises the differential pressure to 60 pounds per square inch. By comparison, a 140 foot conduit conveying 82,200 pounds per hour of 12–30 mesh adsorbent carbon as a dilute suspension in air the pressure differential is 1.12 pounds per square inch and a 10% increase in the air input decreases the pressure differential to 0.99 pound per square inch. Similarly, in aerated or so-called "fluidized" systems the pressure differential decreases with increase in gas velocity. Thus, it is seen that the magnitude of the pressure differential is on the order of 50 times greater in conveyance of compact solids than in dilute suspensions and in many cases is considerably greater. Furthermore, this pressure differential changes positively (increases) in the conveyance of substantially compact solids and negatively (decreases) in the conveyance of fluidized suspensions of solids with increases in conveyance fluid flow rate.

[2] Micromeritics, J. M. Dalla Valle (1943), p. 105.

Still another test for "substantially compact form" involved measuring the pressure drop per unit length along the conduit and calculating the conveyance force ratio from Equation 3. Except in relatively rare cases when the operating bulk density is decreased by an amount approaching 20% of the vibrational bulk density $\rho_s$, due to packing rearrangements of the compact solids and the ratio thus determined, may be as low as 0.8, the conveyance force ratio as thus calculated exceeds 1.0 for conveyance of substantially compact solids whereas in a conduit carrying an aerated suspension a very considerably lower value of $dp/dl$ and a conveyance force ratio well below 1.0 based on the vibrational bulk density is found. Both compact and aerated solids may exist in the same conduit and is a desirable operation in such processes as contact coking wherein the solids increase the size during operation. The increased solids attrition due to the aeration reduces this particle size and may be controlled to balance one effect against the other. In most other cases it is desirable to maintain the entire mass of solids in compact form for minimum energy requirement and solids attrition rate.

Thus in the present invention the granular solids are conveyed in substantially compact form by means of a concurrently depressuring conveyance fluid, if the operating bulk density is not more than 20% less than the static vibrational bulk density, or if there is an increase in pressure differential with increase in fluid flow rate, or if the conveyance force ratio is greater than 1.0.

Each solid particle is continuously in direct contact with several other particles surrounding it and are not free to move relative to them differentiating those conveyance operations in which the solids are aerated, fluidized or otherwise suspended in a fluid and have operating bulk densities always considerably less than 80% of the vibrational or static bulk density.

The solids to inner conduit wall angle of repose $\alpha°$ is defined as the maximum inclination (with respect to a horizontal plane) of a conduit full of granular solids at which the granular solids will not flow therethrough by gravitational forces alone. Gravity flow of solids can occur only when a conduit has an inclination greater than $\alpha°$. In all other flow directions a conveyance force is required to cause motion. Such other flow directions pass through the apex of and are included in the solid angle formed from rotating about a vertical axis the $(90+\alpha)°$ angle struck downward from the axis. The process and apparatus of the present invention is primarily applicable to the conveyance of granular solids in directions included in the solid angle defined above, but it is also applicable though part of the conveyance path is along a direction outside this solid angle.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

We claim:

1. An apparatus for the conveyance of granular solids which comprises an elongated conveyance conduit communicating at its inlet with an elongated curving inlet conduit, a substantially coaxial pressure shell surrounding said inlet conduit, means for flowing granular solids by gravity directly into the opening of said inlet conduit and independently of said pressure shell, means for introducing a conveyance fluid into said inlet conduit, means for depressuring said conveyance fluid concurrently with said granular solids through said inlet and conveyance conduits successively, means for applying a thrust force to solids discharging from the outlet opening of said conveyance conduit thereby maintaining granular solids therein at a bulk density substantially equal to the bulk density of said solids when at rest, means for separating conveyed granular solids from said conveyance fluid discharged from said conveyance conduit, said pressure shell being connected in fluid communication with a source of fluid under pressure to maintain said inlet conduit under an external pressure so as to relieve said conduit of at least a substantial portion of the pressure of conveyance fluid therein.

2. An apparatus for the conveyance of granular solids which comprises an elongated conveyance conduit communicating an induction chamber with a separation chamber, inlet means for granular solids and inlet means for a conveyance fluid opening into said induction chamber, outlet means for granular solids and outlet means for conveyance fluid opening from said separation chamber, means for restricting the discharge of granular solids from said conveyance conduit to apply a thrust force to the discharging solids and thereby maintain said solids throughout said conveyance conduit at a bulk density substantially equal to the bulk density of said solids at rest, a curved inlet conduit communicating with said conveyance conduit and adapted to the gravity flow of solids thereinto from the bottom of said induction chamber, and a substantially coaxial pressure shell surrounding said inlet conduit forming therewith an annular shaped volume communicating with a source of fluid under pressure whereby the outwardly acting forces of conveyance fluid within said inlet conduit are substantially balanced by the inwardly acting forces of said fluid within said annular volume.

3. An apparatus according to claim 2 wherein said inlet conduit comprises an arcuate conduit having a hardened and polished inner surface, said pressure shell comprises another arcuate conduit of larger diameter, said arcuate conduits being integrally attached to each other at their ends.

4. An apparatus according to claim 2 wherein said source of fluid under pressure comprises said inlet means for a conveyance fluid opening into said induction chamber.

5. An apparatus according to claim 2 wherein the communication between said annular shaped volume and said source of fluid under pressure is provided through at least one lateral opening through the wall of said arcuate inlet conduit.

6. An apparatus according to claim 2 wherein the communication between said annular-shaped volume and said source of fluid under pressure is provided in the form of a conduit communicating at one end with said pressure shell and at the other end with said induction chamber.

7. An apparatus according to claim 2 wherein said pressure shell communicates with said source of fluid under pressure at a point on said pressure shell adjacent the outlet of said induction chamber, in combination with a static dense bed of granular solids positioned within said annular-shaped volume, a sealable inlet and outlet opening for said solids opening through said pressure shell, and a fluid outlet opening from said pressure shell at a point adjacent the point of juncture of said arcuate inlet conduit and said conveyance conduit.

8. An apparatus according to claim 7 in combination with a pressure controller instrument connected to and adapted to maintain the fluid pressure at the inlet end of said pressure shell substantially equal to that within the inlet end of said arcuate inlet conduit, and a pressure controller instrument connected to and adapted to maintain the pressure at the outlet end of said shell substantially equal to that within the outlet end of said arcuate inlet conduit.

9. An apparatus according to claim 7 wherein the cross sectional area of said arcuate inlet conduit decreases with distance from the inlet end thereof, in combination with a plurality of additional conduits for fluid opening through said pressure shell and communicating with said dense static bed of solids therein at a plurality of points along the length of said pressure shell and adapted to control the quantity of fluid flowing through said static bed so as to maintain both the pressure and the pressure gradient therein at values substantially equal to those existing within the moving bed of dense solids in said arcuate inlet conduit.

10. An apparatus according to claim 7 wherein said dense static bed of solids disposed within the annular shaped volume between said arcutate inlet conduit and said pressure shell contains individual solid particles whose average mesh size is substantially less than that of the solids to be conveyed so as to minimize the permeability of and the fluid flow through said dense static bed of solids.

References Cited in the file of this patent

UNITED STATES PATENTS

| | | |
|---|---|---|
| 2,412,152 | Huff | Dec. 3, 1946 |
| 2,524,919 | Meincke | Oct. 10, 1950 |
| 2,684,868 | Berg | July 27, 1954 |
| 2,684,872 | Berg | July 27, 1954 |
| 2,703,732 | Schutte | Mar. 8, 1955 |